United States Patent [19]

Kirton et al.

[11] Patent Number: 4,536,411

[45] Date of Patent: Aug. 20, 1985

[54] SPREAD HAVING BUTTER-LIKE PROPERTIES

[75] Inventors: Douglas C. Kirton, Nutley nr Uckfield; Avril B. MacNeill, Gravesend, both of England; Laurentius A. M. Verhagen, Vlaardingen, Netherlands

[73] Assignee: Lever Brothers Company, New York, N.Y.

[21] Appl. No.: 553,916

[22] Filed: Nov. 21, 1983

[30] Foreign Application Priority Data

Nov. 22, 1982 [GB] United Kingdom ................ 8233217

[51] Int. Cl.³ .............................................. A23D 5/02
[52] U.S. Cl. ..................................... 426/603; 426/604
[58] Field of Search ............... 426/603, 604, 530, 663, 426/664

[56] References Cited

U.S. PATENT DOCUMENTS

| | | | |
|---|---|---|---|
| 2,575,874 | 11/1951 | Herlow | 426/603 X |
| 3,033,689 | 5/1962 | Elwood et al. | 426/663 |
| 4,209,546 | 6/1980 | Johansson | 426/603 |
| 4,366,180 | 12/1982 | Altrock et al. | 426/603 X |
| 4,389,426 | 6/1983 | Reissmann et al. | 426/603 X |
| 4,443,487 | 4/1984 | Darling | 426/604 X |
| 4,446,165 | 5/1984 | Roberts | 426/604 X |

FOREIGN PATENT DOCUMENTS 614925 12/1948 United Kingdom .

*Primary Examiner*—Robert Yoncoskie
*Attorney, Agent, or Firm*—Lynne Darcy; James J. Farrell

[57] ABSTRACT

An edible, emulsion spread is produced from a fat constituting the continuous phase of the emulsion and a cream constituting the dispersed phase of the emulsion, wherein the cream contains a fat having a higher melting point than the continuous fat. The emulsion is texturized, reheated and recirculated.

15 Claims, No Drawings

SPREAD HAVING BUTTER-LIKE PROPERTIES

The present invention relates to a process for producing a water-in-oil (w/o) emulsion, particularly margarines and low fat spreads having butter-like properties.

By "butter-like properties" are meant melting properties, plasticity, elasticity and spreadability comparable to those of natural, churned butter. References relating to these properties and their measurements are, for example, J. Dairy Res. 8, 245 (1937), J. C. Davies, and the British Food Manuf. Ind. Res. Inst., the Rheology of Margarine and Compound Cooking Fats, Part I (Res. Rep. 37) and Part II (Res. Rep. 69), 1956, J. H. Prentice.

These is a need of margarines and low fat spreads displaying butter-like properties which are considerably cheaper than natural butter and can be produced by a continuous, industrial process.

Applicants have found a judicious combination of formulation criteria and processing conditions conducive to margarines and low fat spreads having the desired properties.

The process according to the invention for the preparation of a fat-continuous spread comprises:
  (a) producing a proteinaceous oil-in-water emulsion cream comprising from 10 to 40%, based on the weight of cream, of a dispersed fatty phase constituting less than 20% by weight of the total amount of fat present in the spread and containing a primary fat having a melting point at least equal to the melting point of a secondary fat constituting the continuous phase of the spread;
  (b) emulsifying said cream with said secondary fat;
  (c) subjecting the emulsion obtained in (b) to a texturizing treatment involving cooling and working;
  (d) heating at least part of the texturised emulsion to a temperature at which at least the secondary fat melts, mixing it with the fresh emulsion obtained in (b) and subjecting the mixture of both emulsions to the texturising treatment of step (c) to obtain a fat-continuous spread.

The amount of fat dispersed in the cream should not be too high since the cream becomes too thick and processing becomes very difficult. Therefore the cream preferably contains 15 to 35% of fat, based on the cream. The amount of fat dispersed preferably constitutes 2 to 18% of the total amount of fat present in the spread.

The primary fat is preferably a quick crystallizing fat having a melting point ranging from 30° to 70° C., preferably from 35° to 50° C. Useful fats are selected from the group consisting of hydrogenated palmkernel-, coconut-, babassu-, ouricurum-, murumuru-, tucum oil, palm oil and oils hydrogenated under conditions promoting isomerism and forming of triglycerides from fatty acids in the trans-configuration.

Conditions promoting isomerism are known per se and may for instance involve hydrogenation of sunflower oil, soybean oil, rapeseed oil and the like, using a sulphur poisoned nickel catalyst.

Ideal primary fats are palmkernel fat hydrogenated to a melting point of 39° C. and coconut fat hydrogenated to a melting point of 31° C.

In some instances it proved to be extremely useful to use as an emulsion-stabilizer a minor proportion, e.g. 0.1 to 1 wt.%, based on the total fat, of a fat melting within the range of 50° to 70° C. This fat may consist of a hydrogenated fat or a higher melting stearin obtained by fractionation of a high melting fat. Useful fats melting within this range are coconut stearin and hydrogenated cottonseed stearin.

The cream should further contain a proteinaceous component which coats the fat of the cream. The proteinaceous component preferably comprises milk proteins, such as casein or whey protein. The level of protein in the cream preferably ranges from 0.1 to 15 wt.% based on the cream.

It is believed that at least part of the (protein coated) hard fat globules remains at the water/oil interface of the emulsion, whereas some of the globules migrate to the continuous phase and impart beneficial properties to the final spread.

In addition to the protein, the cream may contain a salt such as disodium phosphate, viscosity-increasing agents such as thickening agents and gelling agents, e.g. gelatin, carboxymethylcellulose, pectin, guar gum, xanthan gum, locust bean gum, etc. Preferably xanthan gum is used (at a level of 0.1–0.3%), alone or mixed with carboxymethylcellulose.

A spread according to the invention is preferably produced by (a) preparing a cream by
  (i) preparing a mixture of protein, thickening agent and water of a temperature sufficiently high to enable gelation or thickening to take place and keep the primary fat in the liquid state;
  (ii) adding to said mixture the fatty phase containing the primary fat, which has previously been heated to a temperature above its melting point;
  (iii) pasteurising and subsequently homogenising the mixture to obtain a cream wherein the average diameter of the dispersed fat ranges from 0.2 to 3 microns; and
  (b) emulsifying said cream in a secondary fat.

The spread may contain an emulsifier system consisting of saturated monoglyceride and lecithin.

In some instances, before performing step (b), it is useful to cool the cream (to a temperature preferably ranging from 5° to 15° C.) during a period of time sufficiently long to achieve crystallisation of at least part of the fat.

The secondary fat can be a classical vegetable or animal margarine fat blend comprising liquid oils, hydrogenated oils, fractionated fats and interesterified mixtures of said fats.

A secondary fat preferably used in the process according to the invention will have the following fat solids profile, measured by nuclear magnetic resonance as described in Fette, Seifen, Anstrichmittel 80, 180–186 (1978):

$$N_{10}=40-60; N_{20}=15-35; N_{35}\leq 2.$$

For the production of tub margarines it is, of course, possible to use a softer secondary fat, i.e. a fat having an $N_{10}$ ranging from 20 to 40 and an $N_{20}$ ranging from 10 to 20.

In the emulsification step (b) the temperature of the cream and the temperature of the secondary fat are chosen such that the temperature of the resulting emulsion (emulsification temperature) is preferably at least equal to the melting point of the primary fat and preferably corresponds to the temperature applied in step (d).

Such conditions are compatible with the conditions required for a continuous, industrial process.

Step (d) involves a continuous recirculation of melted texturised emulsion. When problems occur during the packaging operation, the product instead of being dumped, is re-fed into the system through the recirculation loop, which is constantly kept in operation.

In step (d) at least part of the texturised emulsion is heated to a temperature at which preferably both the primary and the secondary fat melt, e.g. a temperature between 40° and 70° C., thereby avoiding the occurrence of undesirable phenomena such as graininess in the end product.

The process described is applicable for producing both conventional margarines and low calorie spreads having levels of fat ranging from 30 to 85%. The low calorie spreads have a fat level preferably ranging from 30 to 60% by weight based on the total spread. In the fat-continuous spreads according to the invention the cream may constitute 15 to 70 wt.% of the total spread, whereas the secondary fat may constitute 30 to 85% by weight of the total spread.

The cooling and texturising treatments are carried out using a system, for example consisting of surfaces-craped, rotated heat-exchangers and crystallizers, e.g. of the Votator ® type.

The invention will now be illustrated in the following examples.

EXAMPLE I

A cream was produced having the following composition:

|  | % |
|---|---|
| Palmkernel fat hydrogenated to 38° C. (primary fat) | 25 |
| Sodium chloride | 10 |
| Disodium phosphate | 0.3 |
| Xanthan gum | 0.15 |
| Carboxymethylcellulose | 0.25 |
| Skim milk powder | 5 |
| Monoglyceride | 0.3 |
| Water | up to 100 |

The cream was produced as follows: Water was heated to 80° C. Disodium phosphate, xanthan gum, carboxymethylcellulose, sodium chloride and the skim milk powder were added. Melted palmkernel fat and monoglyceride (70° C.) were added and the mixture was pasteurized at 83° C., cooled to 50° C. and homogenized (250 at, 50° C.).

A premix was produced from 25.6% of cream, 0.2% of lecithin, 0.2% of monoglyceride and 74.0% (secondary fat) of a fat blend (T=50° C.) consisting of 50% of soybean oil hydrogenated to a melting point of 38° C., 25% of coconut oil and 25% of non-hydrogenated soybean oil.

The emulsification temperature was kept at about 40° C. The premix was fed into a Votator. A portion of the product leaving the Votator was constantly melted at 50° C. and re-introduced into the Votator with fresh premix.

The product emerging from the Votator was presented to a panel of experts. After assessment, the product was found to have butter-like properties.

EXAMPLE 2

The procedure of Example 1 was repeated except that the cream was cooled to 10° C. and kept overnight at this temperature to allow part of the fat to crystallise, prior to emulsification in the secondary fat.

The product displayed excellent organoleptic properties.

EXAMPLE 3

The procedure of Example 1 was repeated except that palm oil hydrogenated to a melting point of 43° C. was used instead of hydrogenated palmkernel fat and that the emulsification temperature was 50° C.

The product displayed excellent organoleptic properties.

EXAMPLE 4

The procedure of Example 1 was repeated except that high erucic acid—rapeseed oil hydrogenated to a melting point of 40° C., using a sulphur poisoned nickel catalyst, was used instead of hydrogenated palmkernel fat.

The product displayed excellent organoleptic properties.

EXAMPLE 5

A low calorie spread was produced by mixing 16.5 wt.% of the cream described in Example 1 with 2.5 wt.% of gelatin, 0.2 wt.% of monoglyceride, 0.15 wt.% of K sorbate, 2 wt.% of beta-carotene and 56.35 wt.% of water, and an interesterified blend obtained by random interesterification of a 40/60-mixture (wt/wt) of palm oil having a melting point of 58° C. and palm kernel fat having a melting point of 39° C., to produce a pre-mix. The emulsification temperature was about 40° C.

The pre-mix was further processed according to the procedure outlined in Example 1.

The product emerging from the Votator was presented to a panel of experts. After assessment, the product was found to have butter-like properties.

We claim:

1. A process for the preparation of a fat-continuous spread, comprising:
   (a) producing a proteinaceous oil-in-water emulsion cream comprising from 10 to 40% by weight of a dispersed fatty phase containing a primary fat selected from the group consisting of hydrogenated palmkernel-, coconut-, babassu-, ouricurum-, murumuru-, tucum oil, palm oil and oils hydrogenated under conditions promoting isomerism and forming of triglycerides in the trans-configuration and having a melting point from 30° to 70° C., wherein said dispersed fatty phase constitutes less than 20% by weight of the total amount of fat present in the spread;
   (b) emulsifying said cream with a secondary fat constituting the continuous phase of said spread and having a melting point equal to or less than the melting point of said primary fat;
   (c) subjecting the emulsion obtained in (b) to a texturizing treatment involving cooling and working;
   (d) heating at least part of the texturized emulsion to a temperature of from 40° to 70° C. mixing said heated texturized emulsion with fresh emulsion obtained in (b) and subjecting the resulting emulsion mixture to the texturizing treatment of step (c) to obtain a fat-continuous spread.

2. A process according to claim 1, wherein the amount of fat dispersed in the cream constitutes 2 to 18% of the total amount of fat present in the spread.

3. A process according to claim 2, wherein the cream contains 15 to 35% by weight of fat.

4. A process according to claim 1, wherein the primary fat has a melting point ranging from 35° to 50° C.

5. A process according to claim 1, wherein the secondary fat has the following fat solids profile:

$$N_{10}=40-60;\ N_{20}=15-35;\ N_{35}\leq 2.$$

6. A process according to claim 1, wherein the cream is cooled prior to step (b), during a period sufficiently long to achieve crystallisation of at least part of the fat.

7. A process according to claim 6, wherein the cream is cooled to a temperature ranging from 5° to 15° C.

8. A process according to claim 1, wherein in step (b) the temperature of the cream and the temperature of the secondary fat are such that the temperature of the resulting emulsion is at least equal to the melting point of the primary fat.

9. A process according to claim 1, wherein a spread is produced which contains 30 to 85% by weight of fat.

10. A process according to claim 1, wherein the cream constitutes 15 to 70 wt.% of the total spread.

11. A process according to claim 1, wherein the cream contains 0.1 to 15% by weight of protein.

12. A process according to claim 1, wherein the cream contains a thickening agent.

13. A process according to claim 12, wherein the thickening agent contains carboxymethyl cellulose, xanthan gum or mixtures thereof.

14. A process according to claim 1, wherein (a) the cream is produced by
  (i) preparing a mixture of protein, thickening agent and water of a temperature sufficiently high to enable gelation or thickening to take place and keep the primary fat in the liquid state;
  (ii) adding to said mixture the fatty phase containing the primary fat, which has previously been melted to a temperature above its melting point;
  (iii) pasteurising and subsequently homogenising the mixture to obtain a cream wherein the average diameter of the dispersed fat ranges from 0.2 to 3 microns; and
(b) said cream is emulsified with a secondary fat.

15. A process according to claim 14, wherein an emulsifier system is used which consists of a saturated monoglyceride and lecithin.

* * * * *